United States Patent
Hu et al.

(10) Patent No.: US 7,550,193 B2
(45) Date of Patent: Jun. 23, 2009

(54) INFRARED RADIATION BLOCKING LAMINATE

(75) Inventors: Xiankui Hu, Jonesboro, AR (US); Brij P. Singh, North Royalton, OH (US)

(73) Assignee: Nanofilm Ltd, Valley View, OH (US)

( * ) Notice: Subject to any disclaimer, the term of this patent is extended or adjusted under 35 U.S.C. 154(b) by 62 days.

(21) Appl. No.: 11/799,924

(22) Filed: May 3, 2007

(65) Prior Publication Data
US 2008/0102282 A1 May 1, 2008

Related U.S. Application Data

(60) Provisional application No. 60/797,972, filed on May 5, 2006.

(51) Int. Cl.
*B32B 7/00* (2006.01)
*B32B 17/06* (2006.01)
*B32B 17/10* (2006.01)
*B32B 27/08* (2006.01)
*B32B 37/02* (2006.01)

(52) U.S. Cl. .................. 428/212; 428/323; 428/328; 428/412; 428/423.1; 428/426; 428/480; 428/500; 428/522; 428/523; 427/487; 427/163.1; 427/372.2; 427/374; 427/402; 359/350

(58) Field of Classification Search .................. None
See application file for complete search history.

(56) References Cited

U.S. PATENT DOCUMENTS

| 4,634,637 A | 1/1987 | Oliver et al. |
| 4,797,317 A | 1/1989 | Oliver et al. |
| 5,071,206 A | 12/1991 | Hood et al. |
| 5,099,621 A | 3/1992 | Schacklette et al. |
| 5,108,873 A * | 4/1992 | Fukui et al. ............ 430/270.19 |
| 5,518,810 A * | 5/1996 | Nishihara et al. ........... 428/328 |
| 5,807,511 A | 9/1998 | Kunimatsu et al. |

(Continued)

FOREIGN PATENT DOCUMENTS

EP    1008564    6/2000

(Continued)

OTHER PUBLICATIONS

Applied Physics Letters, vol. 82, No. 24, Jun. 16, 2003, pp. 4346-4348, Dilute LaB$_6$ nanoparticles in polymer as optimized clear solar control glazing.

(Continued)

*Primary Examiner*—Vivian Chen
(74) *Attorney, Agent, or Firm*—Hudak, Shunk & Farine Co. LPA

(57) ABSTRACT

A laminate comprising metal oxide and a dye is effective for blocking at least 90% of infrared radiation at a wavelength of 1000 nm while providing transmission of at least 40% of visible light at a wavelength of 555 nm. The laminate includes a transparent substrate such as glass or plastic. The metal oxide can be applied as a coating to the substrate either separate or with the dye. The laminate can be used on generally any type of window such as automobiles, houses, or buildings to prevent transmission of infrared heat therethrough.

25 Claims, 1 Drawing Sheet

U.S. PATENT DOCUMENTS

| | | | |
|---|---|---|---|
| 5,925,453 A * | 7/1999 | Kase et al. | 428/323 |
| 6,319,613 B1 | 11/2001 | Takeda et al. | |
| 6,506,487 B2 * | 1/2003 | Nagai | 428/329 |
| 6,528,156 B1 * | 3/2003 | Takizawa et al. | 428/323 |
| 6,620,872 B2 * | 9/2003 | Fisher | 524/403 |
| 6,650,478 B1 | 11/2003 | DeBusk et al. | |
| 6,787,236 B2 * | 9/2004 | Kimura et al. | 428/412 |
| 6,797,384 B2 | 9/2004 | Gasworth et al. | |
| 6,797,396 B1 | 9/2004 | Liu et al. | |
| 6,911,254 B2 * | 6/2005 | Fisher et al. | 428/328 |
| 7,019,459 B2 * | 3/2006 | Hieda et al. | 313/582 |
| 2004/0071957 A1 * | 4/2004 | Fujita | 428/328 |
| 2004/0131845 A1 | 7/2004 | Fujita | |
| 2004/0157048 A1 * | 8/2004 | Nagai | 428/215 |
| 2004/0166238 A1 * | 8/2004 | Nowicki et al. | 427/207.1 |
| 2004/0204555 A1 * | 10/2004 | Noda et al. | 526/242 |

FOREIGN PATENT DOCUMENTS

| | | | |
|---|---|---|---|
| EP | 1 188 551 | * | 3/2002 |
| EP | 1 193 048 | * | 4/2002 |
| EP | 1 419 999 | | 5/2004 |
| JP | 07-100996 | * | 4/1995 |
| WO | WO 86/02038 | | 4/1986 |
| WO | WO 90/08334 | | 7/1990 |
| WO | WO 94/18003 | | 8/1994 |
| WO | WO 0007042 | | 2/2000 |
| WO | WO 02/070254 | * | 9/2002 |
| WO | 02/077081 | | 10/2002 |

OTHER PUBLICATIONS

Nissan Chemical America Corporation—pp. 1 and 2, Electro-Conductive Oxide Solution, 2007.

Degussa Innovation Award 2006, 4 pages, Innovative Applications for Nanoscale Indium Tin Oxide.

Thin Solid Films, 392, 2001, pp. 299-304, Transparent conducting, anti-static and anti-static-anti-glare coatings on plastic substrates.

Thin Solid Films, 411, 2002, pp. 1-5, Transparent and conducting ITO films: new developments and applications.

Thin Solid Films, 445, 2003, pp. 199-206, Indium tin oxide films made from nanoparticles: models for the optical and electrical properties.

Journal of Sol-Gel Science and Technology, vol. 26, 2003, pp. 693-697, Wet Coating Deposition of ITO Coating on Plastic Substrates—Abstract only.

Journal of Sol-Gel Science and Technology, vol. 26, 2003, pp. 693-697, Wet Coating Deposition of ITO Coatings on Plastic Substrates—Abstract only.

* cited by examiner

INFRARED RADIATION BLOCKING LAMINATE

CROSS REFERENCE

This is a U.S. patent application of U.S. provisional application 60/797,972, filed May 5, 2006 for ENERGY BLOCKING FILM, which is hereby fully incorporated by reference.

FIELD OF THE INVENTION

The present invention relates to a laminate comprising a transparent substrate having thereon an infrared radiation blocking layer as in the form of a coating or a film. An effective infrared radiation blocking compound is metal oxide or a hexaboride that can be contained in a transparent adhesive or resin that is desirably ultraviolet light curable. Another infrared radiation blocking compound is an organic or inorganic dye that can be applied as a separate layer or in combination with the metal oxide or hexaboride layer. The laminate of the present invention allows at least about 40% of visible light at a wavelength of 555 nanometers (nm) to pass therethrough and yet effectively blocks at least 90% of infrared light at wavelengths of 1,000 and 2,000 nanometers.

BACKGROUND OF THE INVENTION

Heretofore, films and windows have existed for partially blocking infrared light that has a wavelength of from about 2.5 micrometers to about 750 nm. Such films and windows however are generally only effective in blocking infrared having a wavelength of 1,500 nm and greater. While vacuum deposition and sputter coating of various compounds were somewhat effective in blocking infrared light having a wavelength of 900 nm and longer, these processes are very costly.

The following patents generally relate to various infrared blocking windows or films.

U.S. Pat. No. 5,071,206 relates to a reportedly visually transparent, color corrected, infrared reflecting films for solar heat control. The films employ Fabry-Perot sandwich interference filters which are characterized by having three or more transparent layers of sputter-deposited metal such as silver directly contiguous with dielectric spacer layers and optionally boundary layers. Methods for producing these materials by sputtering techniques as well as glazing materials incorporating these films are also disclosed.

U.S. Pat. No. 5,099,621 relates to a window unit that has at least one pane, of which is coated with a transparent conductive polymer layer that is reportedly reflective and absorptive in an infrared region of the electromagnetic spectrum, transparent in the visible region of the spectrum, and has a transparency ratio greater than 2.

U.S. Pat. No. 5,807,511 relates to a composition for reportedly forming a near infrared screening filter, which comprises a binder (i), a metal oxide or inorganic oxide powder (ii) having a light transmittance ratio (transmittance of light with a wavelength of 550 nm/transmittance of light with a wavelength of 1180 nm) of at least 3, and a dye (iii) having a light transmittance ratio (transmittance of light with a wavelength of 550 nm/transmittance of light with a wavelength of from 740 to 930 nm) of at least 2.7, as essential components.

U.S. Pat. No. 6,528,156 relates to an infrared cut-off layer containing an ITO powder formed on one surface of a base film, to reportedly form an infrared cut-off film. The ITO powder has a minimum value of a diffused-reflection-functional logarithm, $\log f(R_d)$, at a light wavelength of 470 nm or lower, which logarithm is measured on the basis of the following equation, $f(R_d)=(1-R_d)^2/2R_d=\alpha/S$ ($R_d$: a relative reflectance to a standard sample, $\alpha$: an absorption coefficient, S: a scattering coefficient, formulated for a diffused reflection light, and the minimum value of −0.1 or less. There is reportedly provided an infrared cut-off film having a hue of blue.

U.S. Pat. No. 6,650,478 relates to an optical filter in the form of a film which reportedly can be used in a window to control the amount of absorbed light, reflected light, transmitted light and solar energy rejection. The optical filter contains a combination of an interfering Fabry-Perot stack and a massive Fabry-Perot stack.

U.S. Pat. No. 6,797,384 relates to an automotive glazing panel containing a polycarbonate substrate having a coating system reportedly including an inner layer blocking IR and overlying coating material blocking UV radiation and providing a scratch resistant outer coating layer.

U.S. Pat. No. 6,797,396 relates to a birefringent dielectric multilayer film that reportedly reflects in a wavelength region of interest, and preferably reflects at least 50% of light in a band at least 100 nm wide, preferably positioned between wavelengths from about 700 nm to about 2000 nm. The film is heat set to render the film capable of shrinking to conform without substantial wrinkling to a substrate having a compound curvature. The film may be laminated to form a wide variety of non-planar articles.

U.S. Pat. No. 6,911,254 relates to laminates having interlayers reportedly containing an infrared absorbing amount of lanthanum hexaboride ($LaB_6$) coated on or dispersed in a thermoplastic polymeric matrix. Preferably, the $LaB_6$ is combined with other materials, such as indium tin oxide, antimony tin oxide, organic dyes or pigments in a polymeric matrix of polyvinyl butyral (PVB). Alternatively, $LaB_6$ is coated on a sheet of polyethylene terephthalate and encapsulated with one or more sheets of PVB. The interlayers having $LaB_6$ dispersed therein or coated thereon are combined with encapsulation layers, reflective layers, dyed layers and/or pigmented layers.

U.S. Publication 20040071957 relates to a reportedly heat radiation shielding component dispersion containing fine hexaboride particles and a polymer type dispersant in which the fine hexaboride particles are dispersed. The polymer type dispersant is mixed in the fine hexaboride particles in a proportion of from 0.3 part by weight or more to less than 50 parts by weight based on 1 part by weight of the fine hexaboride particles, and the dispersion does substantially not contain any organic solvent. A process for preparing the heat radiation shielding component dispersion is characterized by adding the polymer type dispersant to a dispersion in which fine hexaboride particles have been dispersed in an organic solvent, in a mixing proportion of from 0.3 part by weight or more to less than 50 parts by weight based on 1 part by weight of the fine hexaboride particles, and thereafter removing the organic solvent.

International Publication WO 0007042 relates to a solar control window film reportedly having high visible light transmission and low transmission of near infrared heat energy comprised of a transparent substrate bearing a thin, optically transparent layer of metal, an optically transparent layer of near infrared energy absorbing material and a transparent layer of protective material overlying and protecting the near infrared energy absorbing material and the metal. The near infrared reflecting properties and the near infrared absorbing properties of the respective layers are balanced to provide selective solar heat rejection without excessive transfer of heat into the window glass or glazing material.

European Patent EP 1008564 relates to a solution for forming a film reportedly having a high transmittance and a low reflectivity for visible light, a low transmittance for near infrared radiation, and a surface resistivity of at least 10<6> ohms/square. It contains fine particles of a hexaboride of Y, La, Ce, Pr, Nd, Sm, Eu, Gd, Tb, Dy, Ho, Er, Tm, Yb, Lu, Sr or Ca, and fine particles of ITO or ATO in a weight ratio of from 0.1:99.9 to 90:10. Also disclosed is a film formed on at least one side of a resin film as a base, for cutting off solar heat radiation.

SUMMARY OF THE INVENTION

A laminate generally includes a glass or polymer substrate layer, an infrared radiation blocking layer containing an organic or inorganic dye, and another infrared radiation blocking layer containing an oxide of indium, tin, or antimony, or any combination thereof such as preferably indium tin oxide or antimony tin oxide, or a hexaboride. The laminate blocks at least 90% of infrared radiation at a wavelength of 1,000 nm and at 2,000 nm while transmitting at least about 40% of visible light at a wavelength of 555 nm. Separately, the infrared radiation blocking dye generally blocks at least about 90% and desirably at least about 95% of infrared radiation at a wavelength of from about 800 nm to about 1,500 nm, and desirably from about 900 nm to about 1,500 nm. Similarly, the metal oxide compound effectively serves to block at least about 90% and desirably at least about 95% of the infrared radiation incident thereupon at a wavelength of from about 1,400 nm to about 2,500 nm and more desirably at about 1,500 nm to about 2,500 nm. Thus, the combination of the dye and the metal oxide or hexaboride make it possible to maintain a very high transmittance of visible light while providing a very low transmittance of infrared radiation.

The laminate can take many forms, and in one arrangement comprises a dye layer and a metal oxide layer that are bonded to opposite sides of the optically clear substrate. Another embodiment relates to the metal oxide and the organic or inorganic dye being in the same coating layer. A pressure sensitive adhesive layer as on the dye layer is provided for applying the laminate to windows, etc. A strippable release layer overlies the adhesive until the laminate is ready to be applied.

BRIEF DESCRIPTION OF THE DRAWINGS

The drawings herein are representative of laminates of the present invention and are set forth with respect to purposes of illustration and do not limit the invention thereto.

DETAILED DESCRIPTION OF THE INVENTION

Figure 1:
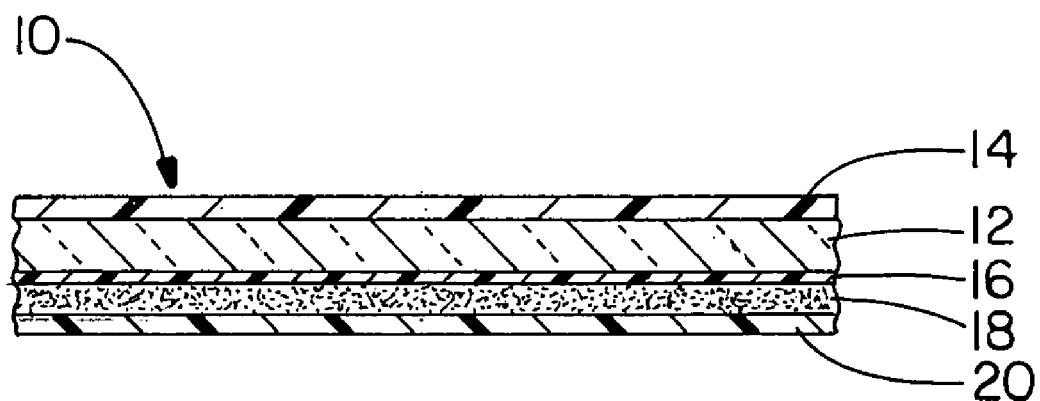
FIG. 1 relates to a side-elevation cross-sectional view of an embodiment of the present invention containing a transparent substrate and an infrared radiation blocking layer on each side thereof.

All visible and infrared radiation transmission values set forth herein are determined in accordance with ASTM 897. The visible light transparent, infrared radiation blocking laminates of the present invention generally have a visible light transparent substrate and one or more infrared blocking layers. With regard to the present invention, visible light refers to light having a wavelength of from about 380 nm to 750 nm, and more desirably about 400 nm to about 700 nm. Infrared radiation is defined as having a wavelength of from about 750 nm or about 800 nm to about 2,500 nm. Near infrared radiation is defined as radiation having a wavelength of from about 800 nm to about 1,500 nm, and desirably from about 900 nm to about 1,500 nm.

Suitable substrate materials of the present invention are substantially transparent and are generally classified as being able to transmit therethrough at least about 50% or at least about 60% or at least about 70% or at least about 75%, desirably at least about 80% or at least about 85%, or preferably at least about 90% or at least about 95% of visible light at a wavelength of approximately 555 nm according to ASTM 897. Any conventional material known to the art and to the literature can be utilized such as various polymers and/or glass. Examples of suitable polymers include various polyesters such as polyethylene terephthalate, polyethylene naphthalate, and the like, various cellulosic compounds such as triacetyl cellulose, and the like, various polycarbonates, various polyacrylates such as poly(alkyl acrylates) and poly(alkyl alkacrylates) wherein the alkyl portion contains from 1 or 2 to about 8 carbon atoms and the alk portion is methyl or ethyl, various transparent polyurethanes such as aliphatic or aromatic polyurethanes, polycarbonate-polyester copolymers, polypropylene, and the like.

In lieu of the polymeric substantially transparent substrates set forth hereinabove, glass such as that utilized for windows can readily be utilized and thus the present invention relates to the numerous conventional types of window glass that are known to the art and to the literature such as silica glass, phosphate-type glass, boron-type glass, and the like and generally have a high degree of light transmission such as at least about 50% or at least about 60% or at least about 70%, desirably at least about 80%, and preferably at least about 90% or at least about 95% at 555 nm.

A desired class of infrared radiation blocking compounds is an oxide of indium, tin, or antimony or any combination thereof, such as indium tin oxide as for example $In_2SnO_3$, or antimony tin oxide, and the like. Another class of infrared radiation blocking compounds are the various hexaborides represented by the formula $XB_6$, wherein X is generally a lanthanide such as Y, La, Ce, Pr, Nd, Sm, Eu, Gd, Tb, Dy, Ho, Er, Tm, Yb, Lu, Sr and Ca. These compounds are generally dispersed in an organic solvent, in a mixing proportion that the polymer type dispersant is from 0.3 parts by weight or more to less than 50 parts by weight based on 1 part by weight of the fine hexaboride particles. Such compounds are set forth in U.S. Publication 2004/0071957, hereby fully incorporated by reference. It is important that the average diameter of the particle size of the solid indium tin oxide and the solid antimony tin oxide compounds be very small such as from about 10 nm to about 50 nm, or about 75 nm, or about 90 nm and preferably from about 10 nm or about 12 nm to about 20 nm or about 30 nm or about 50 nm. It is also important that the indium oxide particles are generally utilized in a reduced state, i.e. not fully oxidized and generally have a blue color or tint. In order to be effective, suitable amounts of the metallic oxide or hexaboride must be utilized such as from about 1 to about 50 grams, desirably from about 5 to about 30 grams, and preferably from about 10 to about 30 grams per square meter of the infrared radiation blocking layer. Excessive amounts of the metallic oxides will block out too much of the visible light whereas too little amounts will permit excessive amounts of infrared radiation to be transferred through the laminate.

The metallic oxides and hexaborides are very effective in permitting at least about 90% and desirably at least about 95% of visible light having a wavelength of 555 nm therethrough and they are also very effective in blocking generally at least about 90% and desirably at least about 95% of infrared radiation therethrough having a wavelength of from about 1,400 nm to about 2,500 nm and preferably from about 1,500 nm to about 2,500 nm. With respect to an infrared radiation wavelength of about 2,000, the amount thereof that is blocked is at least about 90%, desirably at least about 95% and at least about 96%, and preferably at least about 97% or at least about 98% and even at least about 99%. Accordingly, the overall infrared radiation at a wavelength of 2,000 nm through the laminate is blocked in at least the same preceding percentage amounts.

Various different dye classes can be utilized such as amminium dyes as for example metal tris amminium dyes or metal tretrakis amminium dyes wherein the metal includes boron, iron, cobalt, nickel, copper, or zinc such as cobalt tris amminium various metal dithiolene dyes wherein the metal includes boron, iron, cobalt, nickel, copper, or zinc, such as nickel dithiolene, and the like; various diphenylmethane, triphenylmethane and related dyes; various quinone dyes such as naphthoquinone dyes; various azo type dyes; various benzene dithiol type metal complex dyes wherein the metal includes boron, iron, cobalt, nickel, copper, or zinc; various pyrylium type dyes; various squarylium type dyes; various croconium type dyes; various azulenium type dyes; various dithiol metal complex type dyes; various indophenol type dyes; and various azine type dyes. A preferred class of dyes are the metal amminium dyes such as Epolight™ 1178 made by Epolin of Newark, N.J., and chemically is a metal tetrakis amminium wherein the metal is a trade secret but is thought to be one of the compounds set forth herein above. The concentration of the dye in the carrier layer can generally vary from about 0.0001 to about 10 grams per square meter, desirably from about 0.001 to about 5 grams per square meter, and preferably from about 0.01 to about 0.5 grams per square meter of the infrared radiation blocking layer. Once again excessive amounts will unduly reduce the amount of visible light therethrough whereas insufficient amounts will permit excessive near infrared radiation to be transmitted through the laminate. The organic or inorganic dyes used in the present invention are very effective in blocking near infrared radiation wavelengths (800 or 900 to 1,400 or 1,500 nm) such as at least about 90% and desirably at least about 95% of the infrared radiation light incident thereupon. Yet, the various classes of organic or inorganic dyes of the present invention readily permit at least about 90% and desirably at least about 95% of visible light therethrough having a wavelength of about 555 nm. More specifically, the dyes of the present invention are effective in blocking infrared radiation having a wavelength of about 1,000 nm or about 1,200 nm in an amount of generally at least about 90%, desirably at least about 95% or at least about 96%, and preferably at least about 97% or at least about 98% or even at least about 99%. Thus, the laminate effectively blocks at least the same preceding percentage amounts of infrared radiation at 1,000 nm and 1,200 nm.

The various infrared radiation blocking compounds such as the metallic oxides and the organic or inorganic dyes are desirably contained in a resin or polymer layer. Generally any substantially transparent polymer can be utilized such as those known to the art and to the literature including the above noted polymers utilized for the substrate later, the same being hereby fully incorporated by reference. Examples of suitable polymers that are utilized as carriers for the metallic oxide compounds and the near infrared absorbing organic dyes include various acrylic resins such as the various alkyl acrylates noted above with a specific example being butyl methacrylate. Other suitable polymers for the infrared radiation layer(s) include various polyesters such as the above noted polyethylene terephthalate and polyethylene naphthalate as well as the above-noted cellulosic compounds, polycarbonates, polyurethanes as well as copolymers of polyurethanes and polycarbonates, polyethylene, and the like.

The metallic oxide containing layer and/or the organic or inorganic dye containing layer can generally be a thermoplastic which is applied in a melted condition in a thin coating as by mechanical means such as spraying, roller coating, brushing, or calendering, and the like, and allowed to cool and thus solidify or it can be so applied. The infrared radiation coating or films of the present invention are thus easily, quickly, and inexpensively applied since they are not applied (free of) as by electrolysis, vapor deposition, vacuum, sputtering, or the like. The coating can contain suitable curing agents so that it can be subsequently cured. Suitable cure agents include various ultraviolet curatives known to the art and to the literature and can be utilized in sufficient amounts so that upon application of ultraviolet light thereto will form a cured or crosslinked polymer or resin. Representative UV curatives include 1-hydroxycyclohexyl phenyl ketone, benzophenone, and dimethylphenylacetophenone.

The laminates of the present invention allow at least about 40% or at least about 50% or at least about 60% or at least about 65%, desirably at least about 70%, and preferably at least about 72% or at least about 75% of visible light at a wavelength of 555 nm to pass therethrough.

Referring now to FIG. 1, that is submitted for purposes of illustrating a representative embodiment of the claimed subject matter only and not for purposes of limiting same, a multilayer laminate 10 includes an optically clear polymer or glass substrate layer 12 having a polymer layer 14 containing a metallic oxide compound therein bonded to one side thereof and a polymer layer 16 containing an organic or inorganic dye therein bonded to the opposite side thereof. A pressure sensitive adhesive layer 18 is provided on the dye layer, and a strippable release sheet 20 is provided on the adhesive layer. The embodiment of FIG. 2 relates to a single infrared radiation blocking layer 34 containing both the one or more metallic oxide compounds and one or more organic or inorganic dye compounds therein. More specifically the infrared radiation blocking laminate of the present invention is indicated by the numeral 30 and comprises transparent substrate 32 containing the infrared radiation blocking layer 34 on one side thereof. Pressure sensitive adhesive layer 38 can be located either on the infrared radiation blocking layer 34 as shown, or on substrate layer 32. Release liner 40 resides on pressure sensitive adhesive layer 38.

Figure 2:
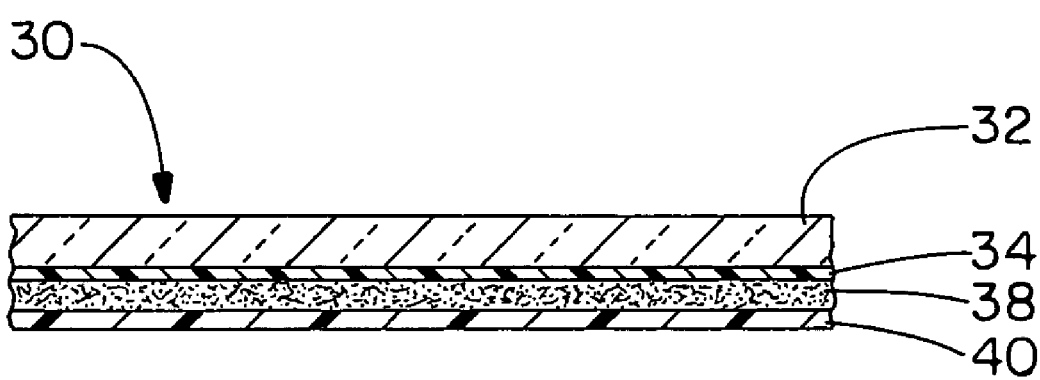
FIG. 2 relates to a side-elevation cross-sectional view of another embodiment wherein one layer containing two different infrared blocking compounds is adhered to one side of a transparent substrate.

The laminate thickness is not critical, but thick laminates can exhibit optical distortion and provide reduced optical clarity. Representative thicknesses will be given simply by way of example. Laminates 10 and 30 each, independently, when the substrate is a polymer can have a total thickness in the range of about 1 to about 300 or about 400 microns, more preferably from about 10 to about 200 microns and most preferably from about 30 to about 200 microns. When the substrate is a glass, the total thickness of the laminate can vary from about 600 microns to about 15 mm and preferably from about 1.28 mm to about 10 mm or about 10.2 mm. The thickness of the polymeric visible light transmission substrate can vary widely such as from about 0.5 to about 7 mils (about 13 to about 172 microns), desirably from about 1 to about 3 mils (about 25 to about 76 microns), and most desirably from about 1.5 to about 2.5 mils (about 38 to about 63 microns) such as about 2 mils (about 51 microns). With respect to glass as the substrate, the thickness thereof is greater than the polymer substrate and generally can range from about 25 or about 40 to about 500 mils (about 635 microns or about 1 mm to about 12.7 mm) and preferably from about 50 or about 75 mils to about 300 mils or about 400 mils (about 1.27 mm or about 1.9 mm to about 7.62 mm or about 10.1 mm). Of course, the substrate can also relate to at least one glass transparent layer and at least one polymeric light transmission layer. Typically, either a glass substrate layer or a polymeric visible light substrate layer is only utilized. Infrared blocking layer 14 that contains the metal oxide can have a thickness in the range of about 1 to about 20 microns, more preferably about 2 to about 15 microns, and most preferably about 3 to about 15 microns. In the embodiment of FIG. 2, combined metal oxide and dye blocking layer 34 can be the same thickness, that is, from about 1 to about 20 microns, desirably from about 2 to about 15 microns, and preferably from about 3 to about 15 microns. Infrared blocking layer 16 that contains dye can be about 0.1 to about 10 microns thick, more preferably about 0.5 to about 10 microns, and most preferably about 0.5 to about 5 microns. Adhesive layers 18 and 38, each independently, can have a thickness of about 1 to about 100 microns, more preferably about 5 to about 100 microns, and most preferably about 12.5 to about 100 microns. Release layers 20 and 40, each independently, can have a thickness in the range of about 1 to about 100 microns, more preferably about 5 to about 100 microns and most preferably about 12.5 to about 100 microns. In a specific example, substrate layer 12 is around 50 microns thick, indium tin oxide layer 14 is around 6 microns thick, dye layer 16 is around 0.8 microns thick, adhesive layer 18 is around 20 microns thick, and release layer 20 is around 25 microns thick.

A good indication of the effectiveness of the laminate of the present invention in blocking infrared radiation is the utilization of a light transmission ratio, that is the amount of visible light transmitted at a wavelength of 555 nm divided by the amount of transmitted light at a wavelength of 1,000 nm. Laminates of the present invention readily achieve ratio of at least about 7 or at least about 10, desirably at least about 12 or at least about 15, or at least about 20, or at least about 30, and preferably at least about 50, or at least about 75, or at least about 100 and even at least about 115.

The laminates of the present invention also have good haze values which according to ASTM D 1003-00 are generally less than about 3%, desirably less than about 2% or less than about 1.5%, and preferably even less than about 1%. Accordingly, laminates of the present invention are substantially free of haze.

The invention will be better understood by reference to the following examples which serve to illustrate, but not to limit the present invention.

EXAMPLE 1

An ultraviolet light curable resin was first prepared, that is UV-3 according to the following procedure. First, pentaerythritol tetraacrylate was warmed to approximately 40° C. to melt the viscous solid into clear liquid. 70 grams of pentaerythritol clear liquid, 25 grams of methacrylic acid, and 5 grams of 1-hydroxycyclohexyl phenyl ketone were mixed and sonicated for an hour until the photoinitiator was completely dissolved and the formulation turned into a clear colorless liquid.

In a round-bottom flask were mixed 30 grams indium tin oxide nanoparticles in methyl ethyl ketone, commercially available from Lihochem Inc., Taiwan (25% solids, with an average particle diameter of 50 nanometers) and 11.25 grams of UV-3. The round-bottomed flask was subsequently mounted on the vacuum line of a Buchi RE121 Rotavapor, commercially available from Buchi Laboratory AG, with the bath temperature set to 40° C. Volatile components were removed at a reduced pressure. The resulting material was a homogeneous liquid dispersion of indium tin oxide nanoparticles in a UV-curable resin. Since there was no solvent in the liquid dispersion, the coating formulation had zero VOC and was 100% solid. The formulation was named BHC A.

EXAMPLE 2

15 grams Paraloid B-60, a butyl acrylate, commercially available from Rohm Haas, was dissolved in 85 grams methyl ethyl ketone and named PB-15. In a 2 ounce clear bottle were mixed 0.1 gram Epolight™ 1178, a metal tetrakis ammonium compound, commercially available from Epolin Inc., and 9.90 grams. The mixture was sonicated for 20 minutes. The resulting solution was named BHC B. Different formulations were made according to different dye concentrations. 0.30 gram Epolight 1178 was mixed into 9.70 grams of PB-15, sonicated for 20 minutes, and named as BHC C. 0.50 gram Epolight 1178 was mixed into 9.50 grams of PB-15, sonicated for 20 minutes, and named as BHC D.

EXAMPLE 3

The coating solution BHC A, was applied to a 4 inch by 4 inch polyethylene terephthalate polyester film, for example, 200 gauge Melinex 454, commercially available from DuPont Teijin Films. The coating was drawn down using coating rods #8 and #12, and correspondingly named BH E and BH F. The coating rods were commercially available from RD Specialties. Immediately after coating, the coated sheets were taped onto a polycarbonate plate and placed onto the conveyor belt of a UV Curing Station (Model LC-6B, commercially available from Fusion UV Curing Inc., Rockville, Md.) equipped with a Fusion "H" lamp. The resulting cured coating on the polyester sheets were clear to the eye. On the reverse side of coated polyester film BH E was applied coating formulation BHC D using rod #4 and #8 and the coated BH E films were named BH G and BH H, respectively.

In an exact similar manner, Example 3 was repeated and the two additional laminates were named BH I and BH J respectively.

The coated films were subjected to the following tests and related data were summarized in Table 1. The transmission and haze data were obtained using BYK-Gardner Haze-Gard Plus. The transmission at 900 nm and 1000 nm were obtained using a UV-vis-NIR spectrophotometer, Lambda 900 from Perkin Elmer Corporation.

TABLE 1

Optical characteristics of coated films BH H, BH G, BH J, and BH I (ASTM 897).

| Formulation | Haze | Photoptic Transmission | Transmission at 1000 nm | Transmission at 900 nm | IR Rejection |
|---|---|---|---|---|---|
| BH H | 1.37 | 65.1 | −0.19 | 0.1 | 98.94 |
| BH G | 1.50 | 73.4 | 1.34 | 4.09 | 95.36 |
| BH J | 1.62 | 61.4 | −0.14 | 0 | 99.08 |
| BH I | 1.81 | 70.6 | 0.61 | 2.78 | 96.57 |

As apparent from the above table, laminate of the present invention containing one indium tin oxide layer and one metal tetrakis amminium dye layer resulted in blocking generally at least 95% of infrared radiation thereon at a wavelength of 900 nm.

Further the infrared radiation blocking laminates of the present invention containing both the metal oxide and the organic or inorganic dye were compared with commercial infrared blocking films and the results thereof are set forth in Table 2.

Gila is a type of film made by CPFilms. If it is made according to U.S. Pat. Nos. 4,797,317, 4,634,637, 6,650,478, and GB 2176148, the film is a dye impregnated PET film with vacuum deposited Ni—Cr metal layer as additional solar heat reflector. The film is tinted to allow about 15% to 50% visible light transmission. XIR is a type of film made by Southwall. If made according to WO 90/08334, U.S. Pat. No. 5,071,206, and WO 94/18003, the film is made of sputter coated alternatively with different metal layers to form a Fabry-Perot type interference filter. CS and SPCS are films made by 3M and the brand name is Scotch Tint. These are tinted metallic films and are thought to be similar to Gila Films. Wintech is a type of film made by a South Korean company Wintech. It has layers of metal oxides to absorb heat radiation.

The commercially available films are from 3M (File types: CS-35 and SPCS-35), CPFilms (Film type: Gila-35), Southwall (Film type: XIR-70), and Wintech (Film types: Wintech-green and Wintech-gray). The commercial window films are tested as received.

Another important property of the present invention is that the laminates thereof have excellent abrasion resistance. For example, the Formulation of Example 1 was subjected to a Bayer abrasion test along with CR-39, that is, an aliphatic polycarbonate. The Bayer abrasion test is a well known standard test used to determine the abrasion resistance of curved/lens surfaces. Per this test, a coated lens was mounted on the bottom of a tray next to a CR-39 reference lens of similar diopter. An abrasive, 500 grams of Alundum Norton ZF#12 was poured evenly over the lenses and the tray, and the tray was oscillated for a total of 600 cycles. The haze and transmittance of both the reference and coated samples were measured with a Haze Gard Plus meter, in accordance with ASTM D1003-00, before and after the test has been performed. CR-39 is known for its scratch resistance as a plastic lens used without hard coat applied. As seen from Table 3, after Bayer abrasion tests, CR-39 had a haze around 25%. For a coating of the present invention, the haze after Bayer test was around 27% which is comparable to CR-39 lens. For softer materials such as polycarbonate, the haze after Bayer test was around 70%. Thus, the coating of the present invention had a scratch resistance comparable to CR-39 and was significantly better than polycarbonate materials.

TABLE 2

Optical Performance of Nanofilm's and Commercial Films (ASTM-897)
(All results were obtained using a BYK-Gardner Haze, Haze-Gard Plus Meter.)

| Film Type | Competitive Products | | | | | | Present Invention | |
|---|---|---|---|---|---|---|---|---|
| | 3M CS-35 | 3M SPCS-35 | Gila-35 | XIR-70 | Wintech-green | Wintech-gray | BH G | BH I |
| IR rejection | 40.67 | 59.57 | 40.34 | 91.49 | 81.32 | 71 | 95.36 | 96.57 |
| Visible Light Transmission at 555 nm | 37.3 | 38.3 | 40.5 | 71.9 | 74.5 | 62.7 | 73.4 | 70.6 |
| Haze | 1.3 | 1.84 | 2.09 | 0.71 | 1.82 | 1.49 | 1.34 | 0.61 |
| Transmission at 1000 nm | 56.71 | 38.61 | 61.81 | 7.37 | 34.16 | 40.26 | 1.34 | 0.61 |
| Transmission at 900 nm | 54.7 | 41.27 | 60.77 | 14.26 | 34.48 | 45.93 | 4.09 | 2.78 |
| Transmission ratio 555 nm/1,000 nm | 0.65 | 0.99 | 0.65 | 9.8 | 2.2 | 1.6 | 55 | 116 |

As apparent from Table 2, of the commercial products XIR-70 (does not contain any dye) gave the best results. Unexpectedly, the laminates of the present invention had an infrared radiation transmission at 1,000 nanometers of only 1.34% and 0.61% respectively, whereas the best result of a Competitor was 7.37%. Generally the light transmission of the Competitors range from 34% to 72%! Similar results were obtained with regard to infrared transmission at 900 nanometers. That is, the present invention has an infrared transmission of about 4%, Competitor products range from about 14% up to 61%! With respect to the transmission ratio test, the best competitor prior art product yielded a value of 9.8 whereas the present invention unexpectedly yielded values of 55 and 116, respectfully 5.6 and 11.8 times better!

TABLE 3

Bayer abrasion test data for CR-39 and Nanofilm's nanocomposite coatings.

| | Before Bayer Abrasion Test | | After Bayer Abrasion Test | |
|---|---|---|---|---|
| | Trans. | Haze | Trans. | Haze |
| Control bare CR-39 | 92 | 0 | 91.4 | 24.7 |
| CR-39 coated with BH A | 89 | 0.4 | 88.7 | 26.8 |

The infrared blocking laminates of the present invention can of course be utilized where ever it is desired that infrared radiation be drastically reduced. End uses include building windows, automobile windows, all types of vehicle windows including trucks, planes, railroad trains, and the like.

While it will be apparent that the preferred embodiments of the invention disclosed are represented by the prior examples, it will be appreciated that the invention is susceptible to modification, variation, and change without departing from the intended scope or fair meaning of the subjoined claims.

What is claimed is:

1. A laminate for blocking infrared radiation comprising:
a substrate selected from the group consisting of a transparent glass or a transparent polymer;
at least one infrared radiation blocking layer containing a metal oxide capable of blocking at least 90% of infrared light incident thereon having a wavelength of about 2,000 nanometers, and at least one near infrared radiation blocking layer containing an organic dye, or an inorganic dye, or a combination thereof, capable of blocking at least 90% of near infrared light incident thereon having a wavelength of about 1,000 nanometers; or
at least one combination infrared and near infrared radiation blocking layer wherein both said metal oxide compound and said organic dye, or said inorganic dye, or a combination thereof, are contained therein with said combination layer capable of blocking at least 90% of infrared light incident thereon having a wavelength of about 2,000 nanometers and also capable of blocking at least 90% of near infrared light incident thereon having a wavelength of about 1,000 nanometers;
wherein said at least one infrared radiation blocking layer has a thickness of from about 1 to about 20 microns, wherein said at least one nearinfrared blocking layer has a thickness of from about 0.1 to about 10 microns, and wherein said at least one combination infrared and near infrared radiation blocking layer has a thickness of from about 1 to about 20 microns; and
wherein said laminate is capable of transmitting at least 70% of visible light incident thereupon having a wavelength of 555 nm.

2. The laminate for blocking infrared radiation of claim 1, wherein said metal oxide is an oxide of indium, or antimony, or tin, or any combination thereof, and wherein said organic or inorganic dye is a metal amminium dye, a metal dithiolene dye, a diphenylmethane dye, a triphenylmethane dye, a quinone dye, an azo type dye, a benzene dithiol type metal complex dye, a pyrylium type dye, a squarylium type dye, a croconium type dye, an azulenium type dye, a dithiol metal complex dye, an indophenol type dye, or an azine type dye, or any combination thereof.

3. The laminate for blocking infrared radiation of claim 2, wherein said metal oxide is an indium tin oxide, or an antimony tin oxide, or a combination thereof; wherein said near infrared radiation blocked at a wavelength of about 1,000 nm is at least about 95%, and wherein said infrared radiation blocked at a wavelength of about 2,000 nm is at least about 95%.

4. The laminate for blocking infrared radiation of claim 3, wherein the average diameter particle size of said indium tin oxide or said antimony tin oxide, or said combination thereof, independently, is from about 10 nm to about 90 nm; wherein said dye is a metal amminium dye, or a metal dithiolene dye, or a benzene dithiol type metal complex dye; or any combination thereof; and wherein said infrared radiation blocked at a wavelength of about 2,000 nm is at least about 97%;
wherein said at least one infrared radiation blocking layer has a thickness of from about 2 to about 15 microns, wherein said at least one near infrared radiation blocking layer has a thickness of from about 0.5 to about 10 microns, and
wherein said at least one combination infrared and near infrared radiation layer has a thickness of from about 2 to about 15 microns.

5. The laminate for blocking infrared radiation of claim 4, wherein said metal oxide is said indium tin oxide; wherein said dye is a metal tris amminium dye, or a metal tetrakis amminium dye, or a combination thereof; and wherein said visible light transmitted through said laminate at about 555 nm is at least about 72%; and
wherein said infrared radiation blocking layer is cured, wherein said near infrared radiation blocking layer is cured, and wherein said combination infrared and near infrared blocking layer is cured.

6. The laminate for blocking infrared radiation of claim 5, wherein said indium tin oxide has an average diameter particle size of from about 10 to about 50 nm, wherein said near infrared radiation blocked at about 1,000 nm is at least about 97%, wherein said infrared radiation blocked at about 2,000 nm is at least about 98%, and wherein said laminate is capable of transmitting at least 75% of visible light having a wavelength of 555 nm.

7. The laminate for blocking infrared radiation of claim 6, wherein said transparent glass substrate comprises a silica glass, a phosphate-type glass, or a boron-type glass, or any combination thereof.

8. The laminate for blocking infrared radiation of claim 6, wherein said laminate has a light transmission ratio (transmission of visible light at 555 nm divided by the transmission of near infrared radiation at 1,000 nm) of at least about 75.

9. The laminate for blocking infrared radiation of claim 5, wherein said polymer substrate transparent layer comprises a polyester, a cellulosic compound, a polycarbonate, a polyacrylate, a polyurethane, a polycarbonate-polyester copolymer, or a polypropylene, or any combination thereof.

10. The laminate for blocking infrared radiation of claim 5, wherein said laminate has a light transmission ratio (transmission of visible light at 555 nm divided by the transmission of near infrared radiation at 1,000 nm) of at least about 30.

11. The laminate for blocking infrared radiation of claim 1, wherein said laminate has a light transmission ratio (transmission of visible light at 555 nm divided by the transmission of near infrared radiation at 1,000 nm) of at least about 12.

12. The laminate for blocking infrared radiation of claim 3, wherein said laminate has a light transmission ratio (transmission of visible light at 555 nm divided by the transmission of near infrared radiation at 1,000 nm) of at least about 15.

13. A method of forming a laminate for blocking infrared radiation, comprising the steps of:
(a) forming an infrared radiation blocking mixture of at least one metal oxide and a polymer; and
applying said infrared radiation blocking mixture to a transparent substrate and forming a layer having a thickness of from about 1 to about 20 microns; and
forming a near infrared radiation blocking mixture of at least one dye and a polymer; and
applying said near infrared radiation blocking mixture to a transparent substrate and forming a thin layer having a thickness of from about 0.1 to about 10 microns; or
(b) forming a combination infrared and near infrared radiation blocking mixture of both said at least one metal oxide and said at least said one dye and a polymer; and applying said combination infrared and near infrared radiation blocking mixture to a substrate and forming a thin coating thereon having a thickness of from about 1 to about 20 microns;

wherein said substrate is selected from a group consisting of a transparent glass or a transparent polymer;

said infrared radiation blocking layer and said near infrared radiation blocking layer on said substrate forming a laminate, or said combination infrared and near infrared radiation blocking layer on said substrate forming a laminate; and wherein said laminate is capable of transmitting at least 70% of visible light incident thereupon having a wavelength of 555 nm, wherein said laminate is capable of blocking at least about 90% of near infrared light incident thereon having a wavelength of about 1,000 nm, and wherein said laminate is capable of blocking at least about 90% of infrared radiation thereon having a wavelength of about 2,000 nm.

14. The method according to claim 13, wherein said metal oxide is an oxide of indium, or antimony, or tin, or any combination thereof, and wherein said dye is a metal amminium dye, a metal dithiolene dye, a diphenylmethane dye, a triphenylmethane dye, a quinone dye, an azo type dye, a benzene dithiol type metal complex dye, a pyrylium type dye, a squarylium type dye, a croconium type dye, an azulenium type dye, a dithiol metal complex dye, an indophenol type dye, or an azine type dye, or any combination thereof.

15. The method according to claim 14, wherein said metal oxide is an indium tin oxide, or an antimony tin oxide, or a combination thereof; wherein said near infrared radiation blocked at a wavelength of about 1,000 nm is at least about 95%, wherein said infrared radiation blocked at a wavelength of about 2,000 nm is at least about 95%, wherein the average diameter particle size of said indium tin oxide or said antimony tin oxide, or said combination thereof, independently, is from about 10 nm to about 90 nm; wherein said dye is a metal amminium dye, or a metal dithiolene dye, or a benzene dithiol type metal complex dye, or any combination thereof.

16. The method according to claim 15, wherein said thickness of said at least one infrared radiation blocking layer has a thickness of from about 2 to about 15 microns, wherein said at least one near infrared radiation blocking layer has a thickness of from about 0.5 to about 10 microns, and wherein said at least one combination infrared and near infrared radiation layer has a thickness of from about 2 to about 15 microns, wherein said metal oxide is said indium tin oxide; wherein said dye is a metal tris amminium dye, or a metal tetrakis amminium dye, or a combination thereof; wherein said visible light transmitted through said laminate at about 555 nm is at least about 72%, wherein said infrared radiation blocking layer is cured, wherein said near infrared radiation blocking layer is cured, and wherein said combination infrared and near infrared blocking layer is cured; wherein said indium tin oxide has an average diameter particle size of from about 10 to about 50 nm, wherein said near infrared radiation blocked at about 1,000 nm is at least about 97%, and wherein said infrared radiation blocked at about 2,000 nm is at least about 98%.

17. The method according to claim 16, wherein said transparent glass substrate comprises a silica glass, a phosphate-type glass, or a boron-type glass, or any combination thereof.

18. The method according to claim 17, wherein said laminate has a light transmission ratio (transmission of visible light at 555 nm divided the transmission of near infrared radiation at 1,000 nm) of at least about 50.

19. The method according to claim 17, wherein said infrared radiation blocking layer and said near infrared radiation blocking layer, independently, or said combination infrared and near infrared radiation blocking layer, is applied by brushing, coating, roller coating, spraying, calendering, or by coating bars.

20. The method according to claim 15, wherein said polymer substrate transparent layer comprises a polyester, a cellulosic compound, a polycarbonate, a polyacrylate, a polyurethane, a polycarbonate-polyester copolymer, or a polypropylene, or any combination thereof.

21. The method according to claim 15, wherein said laminate has a light transmission ratio (transmission of visible light at 555 nm divided the transmission of near infrared radiation at 1,000 nm) of at least about 30.

22. The method according to claim 21, wherein said infrared radiation blocking layer and said near infrared radiation blocking layer, independently, or said combination infrared and near infrared radiation blocking layer, is applied by roller coating, calendering, or by coating bars.

23. The method according to claim 15, wherein said infrared radiation blocking layer and said near infrared radiation blocking layer, independently, or said combination infrared and near infrared radiation blocking layer, is applied by brushing, coating, roller coating, spraying, calendering, or by coating bars.

24. The method according to claim 13, wherein said laminate has a light transmission ratio (transmission of visible light at 555 nm divided the transmission of near infrared radiation at 1,000 nm) of at least about 12.

25. The method according to claim 13, wherein said infrared radiation blocking layer and said near infrared radiation blocking layer, independently, or said combination infrared and near infrared radiation blocking layer, is applied by brushing, coating, roller coating, spraying, calendering, or by coating bars.

* * * * *

UNITED STATES PATENT AND TRADEMARK OFFICE
CERTIFICATE OF CORRECTION

| | | |
|---|---|---|
| PATENT NO. | : 7,550,193 B2 | Page 1 of 1 |
| APPLICATION NO. | : 11/799924 | |
| DATED | : June 23, 2009 | |
| INVENTOR(S) | : Xiankui Hu and Brij P. Singh | |

It is certified that error appears in the above-identified patent and that said Letters Patent is hereby corrected as shown below:

Column 4, line 20, "alk" should be -- alkyl --.

Column 5, line 14, "tretrakis" should be -- tetrakis --.

Column 5, line 16, insert semicolon between first and second words.

Signed and Sealed this

First Day of September, 2009

David J. Kappos
*Director of the United States Patent and Trademark Office*